United States Patent [19]
Wilson

[11] 3,718,829
[45] Feb. 27, 1973

[54] RECIPROCATING MOTOR WITH CONDUCTIVE DISC ARMATURE

[75] Inventor: Arthur L. Wilson, Winthrop Harbor, Ill.

[73] Assignee: The Raymond Lee Organization, Inc., New York, N.Y.

[22] Filed: Dec. 8, 1970

[21] Appl. No.: 96,115

[52] U.S. Cl. .................................. 310/27, 310/20
[51] Int. Cl. ................................. H02k 33/00
[58] Field of Search .......... 310/15, 23, 29, 27, 34, 35, 310/20; 318/122, 135

[56] References Cited

UNITED STATES PATENTS

| 930,022 | 8/1909 | Baily | 310/27 |
| 1,167,366 | 1/1916 | Fessenden | 310/15 |
| 2,122,888 | 7/1938 | McLeer | 318/121 |
| 2,820,161 | 1/1958 | Lewis | 310/27 |
| 3,161,793 | 12/1964 | Laithwaite | 310/27 |
| 3,453,463 | 7/1969 | Wildi | 310/27 |
| 538,351 | 4/1895 | Sabin | 310/35 X |

*Primary Examiner*—Donovan F. Duggan
*Attorney*—Max Dressler, R. Howard Goldsmith, James W. Clement, Herman J. Gordon, Ernest Cheslow, Jack Shore, Arnold G. Gulko, Marshall W. Sutker, Francis J. Larkin, Gerson E. Meyers, John P. Milnamow, Ralph R. Rath and Henry S. Kaplan

[57] ABSTRACT

An alternating current operated motor which cuts off current flow during alternate half cycles to produce a reciprocating movement between a coil and a movable member. This movement is applied to a crank shaft to convert reciprocating motion into rotary motion.

7 Claims, 5 Drawing Figures

PATENTED FEB 27 1973
3,718,829
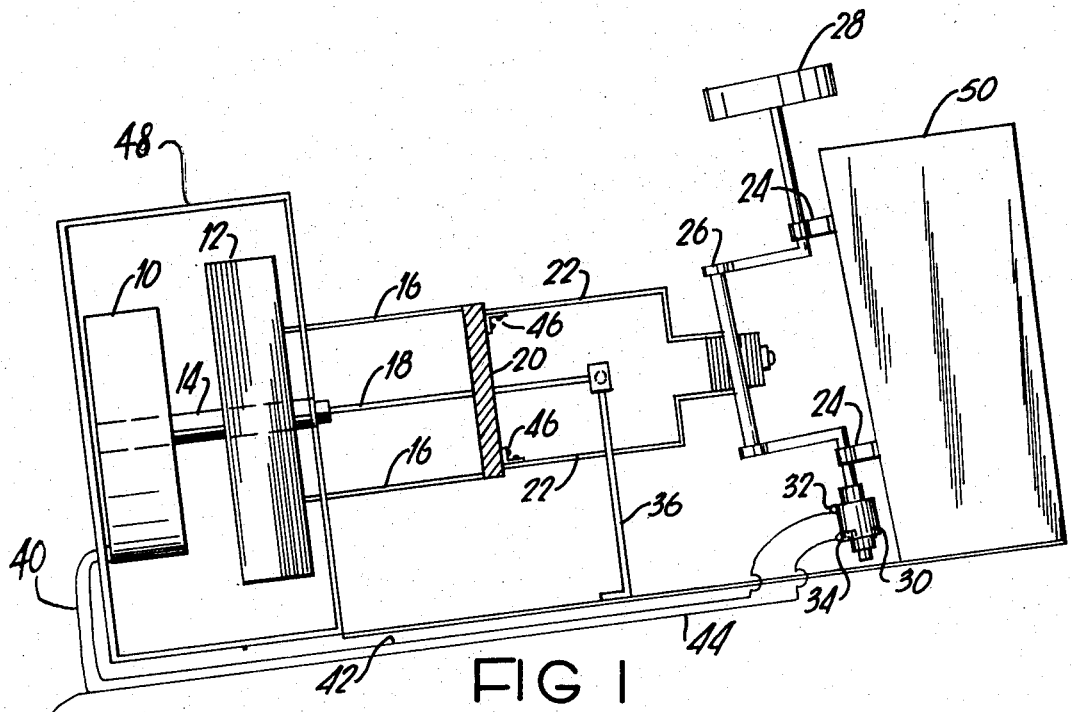
FIG 1
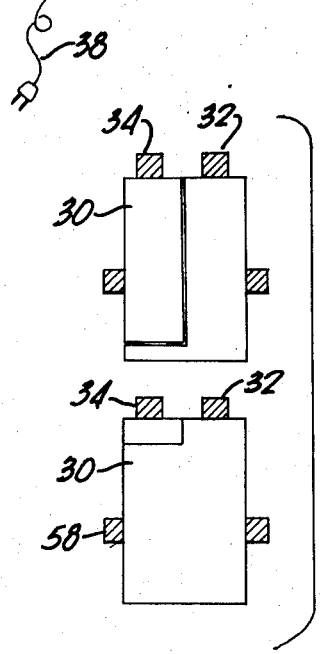
FIG. 2
FIG. 4
FIG. 3
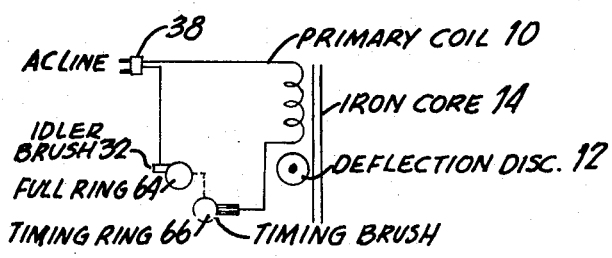
FIG. 5
INVENTOR.
ARTHUR L. WILSON

RECIPROCATING MOTOR WITH CONDUCTIVE DISC ARMATURE

SUMMARY OF THE INVENTION

In my invention means responsive to an alternating current input energizes a coil on alternate half cycles and deenergizes same during the remaining half cycles. This action produces alternately an expanding and contracting magnetic field. A movable member is moved away from the coil when the field is expanding and is moved toward the coil when the field is contracting. Means coupled between the member and the crank of a crank shaft applies the reciprocating motion to the crank to rotate the shaft.

BRIEF DESCRIPTION OF THE DRAWINGS

In the drawings:
FIG. 1 is a view of my motor;
FIG. 2 is a view of the timer and associated parts shown in open and closed positions;
FIG. 3 is an end view of certain parts of the timer;
FIG. 4 is a detail view showing the timer, brush; and
FIG. 5 is a circuit diagram of my invention.

DETAILED DESCRIPTION OF PREFERRED EMBODIMENTS

In the drawings, the following parts have the following members:

| | |
|---|---|
| A.C. Coil | 10 |
| Dia-Magnetic (aluminum) disc | 12 |
| Magnetic (iron) core or pole | 14 |
| Push rods | 16 |
| Guide rods | 18 |
| Guide bar | 20 |
| Connecting rods and bearing assembly | 22 |
| Main bearings | 24 |
| Crank shaft | 26 |
| Flywheel | 28 |
| Timer-Roller (commuter slip ring device) | 30 |
| Idler brush | 32 |
| Timer brush | 34 |
| Support for guide rods | 36 |
| A.C. power plug | 38 |
| Wire to coil | 40 |
| Wire between coil and idler brush | 42 |
| Wire between timer brush and plug | 44 |
| Wrist pins | 46 |
| Exterior iron core | 48 |
| Crank shaft main bearing support | 50 |
| Brush roller | 52 |
| Adjustment screw | 54 |
| Fine timing adjustment | 56 |
| Bushing | 58 |
| Slip rings | 60 |
| Set screw | 62 |
| Full ring | 64 |
| Timing (half) ring | 66 |
| Insulator | 68 |

Referring now to FIGS. 1–5, my invention is an electric motor wherein an alternating current creates a reciprocating motion which in turn is converted to rotary motion.

When disc 12 is close to coil 10 and shaft 26 is several degrees past top dead center (in the direction of rotation) the alternating current circuit is just closed at the timer 30, through brushes 32 and 34, energizing coil 10. The field of the coil causes disc 12 to surge or be deflected (disc is a suitably polarized movable secondary coil) away from coil 10 in the direction of shaft 26. When the shaft is near dead bottom center, the timer open circuits the part of the ring under brush 34 opening the circuit in coil 10. The momentum of the fly wheel 28 returns the disc to start position.

It will be seen that disc 12 slides along the core 14 in moving away from the coil, moving rods 16 to slide bar 20 on rods 18. Bar 20 pushes the connecting rod and bearing assembly 22 which moves shaft 26. On the return half cycle with current off, the momentum keeps the shaft turning and returns the other parts to original position. The motor can produce clockwise or counter-clockwise rotation by adjusting the relative position of the timer roller on shaft 26 and the position of brush 34 on the timer roller.

The apparatus can be adapted to operate at ultra high audio frequencies with power and speed being controlled by proper selection of current values and frequency.

A plurality of discs or secondary coils can be used to increase power and starting torque.

While I have described my invention with particular reference to the drawings, such is not to be considered as limiting its actual scope.

Having thus described this invention, what is asserted as new is:

1. An electric motor comprising in combination:
   an electromagnetic coil;
   timing means for periodically connecting a varying voltage across said coil to periodically energize said coil;
   a member of conductive generally dia-magnetic material;
   means for supporting said member for reciprocating motion between a first position adjacent said coil and a second position spaced away from said coil;
   said member being moved from said first position to said second position in response to each periodic energization of said coil;
   a crankshaft;
   means connected between said member and said crankshaft to impart rotary motion to said shaft in response to said reciprocating motion of said member;
   and means associated with said crankshaft for returning said member to said first position adjacent to said coil when said coil is de-energized.

2. A motor as claimed in claim 1 wherein the speed of said motor is a function of the frequency of said voltage.

3. A motor as claimed in claim 1 wherein said member is a generally annular disc, and said means for supporting said disc includes a stationary generally ferro-magnetic core extending through the central opening of said annular disc, said disc being reciprocally slidable on said stationary ferro-magnetic core.

4. A motor as claimed in claim 3 wherein said generally annular disc is made of aluminum.

5. A motor as claimed in claim 1 wherein said means for returning said disc to its position adjacent said coil includes a flywheel connected to said crankshaft.

6. A motor as claimed in claim 1 wherein said switching means is operative to connect said varying voltage across said coil as a function of the position of said member relative to said coil.

7. An electric machine comprising in combination:
   electro-magnetic coil means;
   timing means for periodically connecting a varying voltage across said coil means to periodically energize said coil means;
   a member of conductive generally dia-magnetic material;

means for supporting said member for reciprocating motion towards and away from said coil means;

said member moving away from said coil means in response to the said periodic energization of said coil means to effect said reciprocating motion in response to said periodic energization of said coil means;

a crankshaft; and means connecting said member and said crankshaft to impart rotary motion to said shaft in response to said reciprocating motion of said member.

* * * * *